United States Patent [19]

Takahashi

[11] Patent Number: 5,530,781
[45] Date of Patent: Jun. 25, 1996

[54] OPTICAL FIBER LIGHT COUPLING INTERFACE WITH AN ENLARGED INCIDENT SURFACE AND METHOD OF MAKING SAME

[75] Inventor: Mitsuo Takahashi, Matsudo, Japan

[73] Assignee: Seikoh Ginken Co., Ltd., Matsudo, Japan

[21] Appl. No.: 313,790

[22] Filed: Sep. 28, 1994

[30] Foreign Application Priority Data

May 17, 1994 [JP] Japan .................................. 6-128200

[51] Int. Cl.⁶ .................................................. G02B 6/26
[52] U.S. Cl. ............................................. 385/43; 385/88
[58] Field of Search .................................. 385/43, 48, 50, 385/39, 32, 117, 121, 88

[56] References Cited

U.S. PATENT DOCUMENTS

| | | | |
|---|---|---|---|
| 3,779,628 | 12/1973 | Kapron et al. | 385/43 |
| 4,076,378 | 2/1978 | Cole | 385/43 |
| 4,370,021 | 1/1983 | Khoe et al. | 385/43 |
| 4,641,912 | 2/1987 | Goldenberg | 385/43 |
| 4,654,532 | 3/1987 | Hirschfeld | 385/43 |
| 4,723,825 | 2/1988 | Herold | 385/43 |
| 4,729,621 | 3/1988 | Edelman | 385/43 |
| 4,737,004 | 4/1988 | Amitay et al. | 385/43 |
| 4,763,976 | 8/1988 | Nolan et al. | 385/43 |
| 4,807,954 | 2/1989 | Oyamada et al. | 385/43 |
| 4,946,239 | 8/1990 | Garmon | 385/43 |
| 5,074,633 | 12/1991 | Cohen et al. | 385/43 |
| 5,333,218 | 7/1994 | Ortiz, Jr. | 385/43 |
| 5,337,380 | 8/1994 | Darbon et al. | 385/43 |
| 5,361,383 | 11/1994 | Chang et al. | 385/43 |
| 5,420,948 | 5/1995 | Byron | 385/43 |

OTHER PUBLICATIONS

"Machine Design Handbook" published by Maruzen Co., Ltd., p. 89 (1973).

"Ideal Microlenses for Laser to Fiber Coupling," Edwards et al., IEEE Journal of Lightwave Technology, vol. 11, No. 2, pp. 252–257 (Feb. 1993).

(General Catalog) "Dielectric Mirror Coatings" published by Newport Co., Ltd. p. J-62 (1990).

Primary Examiner—Rodney B. Bovernick
Assistant Examiner—Hemang Sanghavi
Attorney, Agent, or Firm—Spencer & Frank

[57] ABSTRACT

An optical fiber light coupling interface effective for feeding and propagating light power dispersed from a light source, and a method of forming the interface. The interface includes an optical fiber having an optical axis, a core, and a clad surrounding the core, the core and the clad having respective radii. The optical fiber further includes an enlarged input end face where the respective radii of the core and the clad assume respective first values, the respective radii of the core and the clad decreasing in a direction away from the input end face along the optical fiber to respective second values at a first transitional region of the optical fiber, the respective second values being less than the respective first values. The input end face is formed by applying a compressive stress to the optical fiber for enlarging the respective radii of the core and the clad at a part of the optical fiber while fusing that part by heating. The optical fiber is thereafter cut at that part and polished to form the input end face. The optical fiber also includes a pair of tapered portions where the respective radii of the core and the clad decrease from their respective second values at the first transitional region to respective minimum values, and thereafter increase to their respective second values, in a direction away from the input end face along the optical fiber. An optical reflection layer is formed radially outwardly from the core and the clad.

7 Claims, 4 Drawing Sheets

OPTICAL FIBER LIGHT COUPLING INTERFACE WITH AN ENLARGED INCIDENT SURFACE AND METHOD OF MAKING SAME

BACKGROUND OF THE INVENTION

1. Field of the Invention

The present invention relates to an optical fiber light coupling interface with an enlarged incident surface to couple the light power from a light source to an optical fiber, and especially to a light coupling device of an optical fiber which inputs the light power dispersed from such a light source i.e., a laser diode, or a light emitting diode, to an enlarged incident end-face which emits diverging light, and outputs it to an optical fiber.

2. Prior Art

A number of conventional light coupling devices, each of which couples light power from a light source to a single-mode optical fiber, have been proposed and used. A conventional light coupling device is constructed using a lens system consisting of one or more optical lenses, and the system is arranged in a space between a light source and an optical fiber end-face. In this type of light coupling device, the spot radius of the light beam radiated from the light source is adjusted to be the mode radius of the optical fiber core in order to improve the efficiency of the light coupling between the light source and the optical fiber.

A reflection light loss at a surface of an optical lens in an optical conventional coupling device is approximately 14% for each lens. Optical power (Pa) incident on a core of an optical fiber can propagate effectively through the optical fiber core of the conventional light coupling device.

Since a core of a single mode optical fiber is 9 to 10 μm in diameter, existing alignment errors of the optical axes among the light source, optical fiber, and optical lens system remarkably decrease the efficiency of light coupling.

Efficiency η of light coupling is given in terms of the alignment error among the axes of these optical components by expression (1):

$$\eta = \exp(-2d^2/\omega^2) \quad (1)$$

where d is an alignment error(μm), and ω is the mode radius of the optical fiber. Assume that efficiency η of light coupling at the alignment error of 0 μm is 100%. Efficiency η of light coupling for d=2.5 μm and ω=5 μm is then given as approximately 60%.

If an optical lens system is used to propagate a light beam in an optical coupling device, it is necessary alignment errors of the optical axes among the optical components to be corrected. Efficiency η of the light coupling system depends on the accuracy of correction. In addition, reflection light losses at the surfaces of the lenses are added each time the light beam passes through a lens surface. Due to these difficulties, efficiency η of the light coupling of the system was limited to at most approximately 40% in most cases.

A light coupling device of direct coupling type or a light coupling device of simple structure, wherein no lens system is arranged in the space between the light source, i.e., a laser diode or a light emitting diode, and the single-mode optical fiber end-face, as shown in FIG. 4, has been recommended.

FIG. 4 shows the principle of operation of a light coupling between a light source and an optical fiber end-face according to the proir art. Here no lens system is arranged in the space between the light source and the optical fiber end-face.

In FIG. 4, 1 denotes a light source, i.e., a laser diode, 2 denotes the core of an optical fiber 6, 3 denotes the clad of the optical fiber 6, 4 denotes the total light beam radiated, and the light beam 5 incident on the core 2 of the optical fiber 6. When a laser diode is used as the light source, the intensity of light 4 emitted from the laser diode 1 in radiation angle θr is distributed in accordance with the Gaussian distribution, and the light beam is coherent. Due to the diffraction of coherent light beam with the Gaussian distribution, an elliptical radiation pattern is formed. The elliptical pattern has a spread of 40 to 60 degrees along the XX' axis and a spreading of 20 degrees along the YY' axis. Light power Pa incident on the core 2 of the optical fiber is calculated by:

$$Pa = I_0\{1 - \exp(-2a^2/\omega_z^2)\}$$

where $I_0$ is the intensity of the light power emitted from the light source, "a" is the radius of the core of the single-mode optical fiber (=5 μm), and "$\omega_z$" is the radius of the light beam incident on the optical fiber end-face, at a distance z measured from the light source. The average radiant angle $\theta_r$ of the total light flux 4 is assumed to be 25 degrees. The numerical aperture for the light power incident on the core of the single-mode optical fiber is assumed to be NA=$\theta_1$=5.3 degrees.

Light power Pa incident on the end-face of optical fiber core 2 is calculated to be approximately 8%. Remaining light power Pa, which is approximately 92% of the total light power, is incident on optical fiber clad 3 and other areas. The light power incident on optical fiber clad 3 is radiated to outer surface 6 of the optical fiber clad 3 and results in becomes a radiation loss.

Assume that optical fiber end-face 7 approaches light source 1 of a laser diode as much as possible; in that case, the light power incident on the optical fiber core 2 at the incident angle of NA=$\theta_1$=5.3 degree or more cannot propagate along the optical fiber, although the light power incident on optical fiber core 2 at an incident angle of less than NA=$\theta_1$=5.3 degrees can propagate along the optical fiber.

A light coupling device of simple structure, which is built in accordance with the direct coupling structure as shown in FIG. 4, is easy to build, but impractical in most cases due to its low efficiency of light coupling. However, since no optical lens is used to simplify the configuration of the assembly in the above method of direct coupling, a number of variations have been proposed to improve the efficiency of light coupling.

For instance, a light coupling device shown in FIG. 5 represent such a variation according to the prior art, and is described in "Ideal Microlenses for Laser to Fiber Coupling" by Christopher A. Edwards, et.al., IEEE Journal of Lightwave Technology, Vol. 11, No. 2, PP. 252–257, (February 1993).

FIG. 5 shows an example of a cross-sectional view of the light coupling device constructed in accordance with the method of direct coupling.

A tapered portion 9 wherein the radius of an optical fiber 8 is reduced toward the end-face of the optical fiber 8 is formed by fusing and drawing the optical fiber 8 so that the mode radius of a core 10 is extended, and a hemisphere microlens 11 is formed at the top of the tapered portion 9 due to surface tension caused by fusing the optical fiber end-face.

In FIG. 5, distance z between a light source of laser diode 1 and the optical fiber end-face is 8.5 μm, and radius R of the surface curvature of the microlens 11 is 5.7 μm. The efficiency η of the light coupling is reported to be approximately 50%. In this example, the numerical aperture is small because of the very small radius of microlens 11. Errors can occur in aligning the optical axes between the light source and the optical fiber, which both limit the efficiency of light coupling of the device.

An optical connector employing field modification invented by Nolam, et.al., is disclosed in U.S. Pat. No. 4,763,976, will be explained referring to FIG. 6. FIG. 6 shows a cross-sectional view of the optical connector according to the prior art. In FIG. 6, a glass tube 15 having optical refractive index $n_3$, which is smaller than the optical refractive index $n_1$ of an optical fiber clad 14, is concentrically arranged in a unit structure around outer surface 13 of the clad 14 of an optical fiber 12, and the end-face of the optical fiber 12 is finished to be small by fusing and drawing the various elements together. In the example shown in FIG. 6, the mode radius of optical fiber core 16 is extended to be twice as large as the normal mode radius for the normal optical fiber so that the efficiency of light coupling might not be decreased even if an alignment error has occurred in between the optical axes. The proposed device shown in FIG. 6 is aimed to improve the efficiency of light coupling.

When the ratio of the end-face diameter to the normal optical fiber diameter is 1 to 4 in the tapered portion, the mode radius $\omega$ of the optical fiber core is reported to be 10 μm. If the offset (d) of the optical axes between the light source and the optical fiber is 2.5 μm, the efficiency ($\eta$) of light coupling is calculated to be 88% because only the offset of the optical axes is considered to decrease the efficiency of light coupling.

From the technical point of view, finishing of an optical fiber to make a tapered portion in the shape shown in FIG. 6 is however not so easy, and the practical fabrication is considered to be difficult.

Both alignment errors due to the offset of the optical axes between the light source and the optical fiber, and the numerical aperture (NA) of the optical fiber core reduce the light power which is effectively input to the optical fiber core. These limiting factors reduce the efficiency of light coupling to 50% or less in many conventional devices.

SUMMARY OF THE INVENTION

The object of the present invention is to provide an optical fiber light coupling interface with an enlarged input surface into which light power is entered, in order to accept the light power at an incident angle in the wide angle range so that the offset between the optical axes of the light source and optical fiber can be disregarded, if any, to keep the efficiency of light coupling high, and that the incident light power can propagate at a high efficiency.

The optical fiber light coupling interface with an enlarged input surface built according to the present invention, feeds the light power from the light source to the optical fiber. The optical fiber of the optical fiber light coupling device in accordance with the present invention is constructed using an optical reflection layer and light coupling portion which consists of an extended optical fiber input end-face consisting of an enlarged core and an enlarged clad which are fabricated by such processes that a stress of compression is applied to a part of the optical fiber along the optical axis thereof so that the radius of a part of the optical fiber is enlarged while the optical fiber is fused by heating. The optical fiber is cut along the plane perpendicular to the optical axis of the optical fiber at the point where the radius of the optical fiber is enlarged, and then the plane is polished. The optical fiber includes a pair of tapered portions where the radii of the core and the clad of a normal part of the optical fiber, or a portion (that is, a portion where the radii of the core and clad assume respective predetermined normal values) near the enlarged optical fiber input end-face at a first transitional region are gradually decreased to minimum values as the distance from the enlarged optical fiber input end-face increases, and then increased again until the normal optical fiber radius after passing through the minimum point of radius, that is, a second transitional region where the radii of the core and the clad are at thier respective minimum values. The optical reflection layer is formed outside the coupling means.

The optical reflection layer which reflects the total light incident thereon can be a mirror coating layer of dielectric material or a metal film layer with a high reflection coefficient, i.e., a layer made of aluminum, copper, gold, or silver film.

The light coupling portion is mounted to a ferrule which has been made to accept the extended optical fiber input end-face at one end of a hole bored at the center thereof.

BRIEF DESCRIPTION OF THE DRAWINGS

FIG. 2 shows the steps in manufacturing the optical fiber light coupling interface with an enlarged input surface according to the present invention; in FIG. 2:

DETAILED DESCRIPTION OF THE PREFERRED EMBODIMENT

Figure 1:
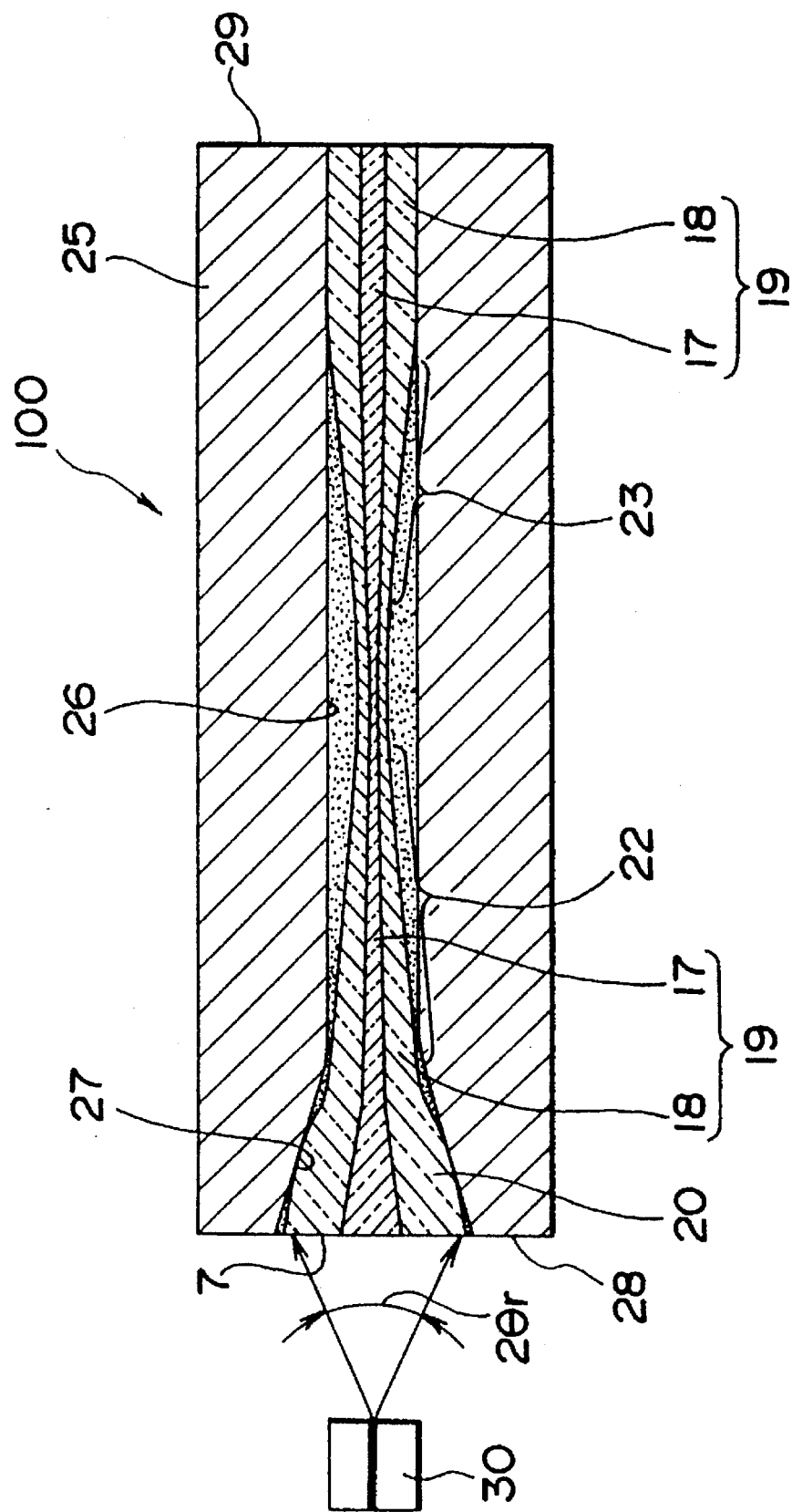
FIG. 1 shows a cross-sectional view of an embodiment of the optical fiber coupling interface with an enlarged input surface according to the present invention.

The optical fiber light coupling interface with an enlarged input surface according to the present invention will be described in detail referring to the drawings.

Figure 2A:
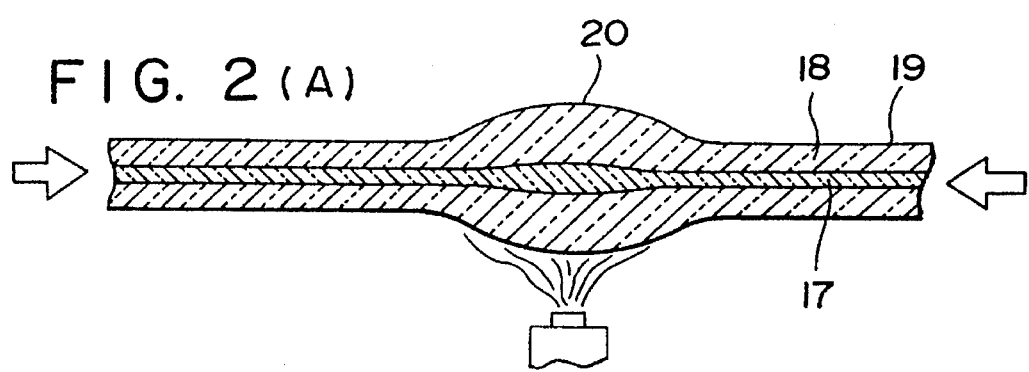
FIG. 2(A) shows the first step of forming an elliptical-shaped enlarged portion according to the present invention.
Figure 2B:
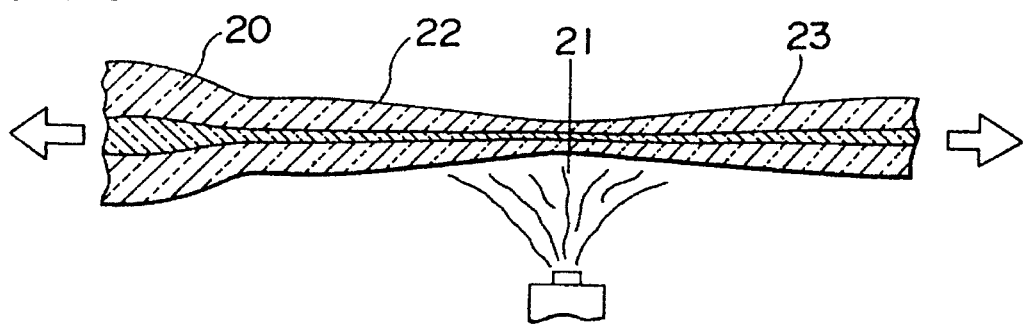
FIG. 2(B) shows the second step of fabricating a pair of tapered portions having a smallest diameter at midpoint thereof according to the invention.

The portion in FIG. 2(A) is formed by applying a stress of compression along the optical fiber axis while a single-mode optical fiber 19 having a cross-section consisting of concentric core 17 and clad 18 is partly fused by heating. Portions 22, 23 in FIG. 2(B) are formed by fusing and drawing the optical fiber 19 near the elliptical-shaped enlarged portion 20. The midpoint of portions 22, 23 is at 21, where the portions have their smallest diameter.

Figure 2C:
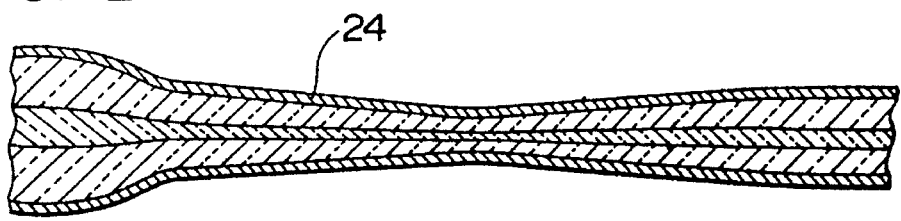
FIG. 2(C) shows a process of forming an optical reflection layer outside the optical fiber.

In FIG. 2(C), the reflection layer 24 is formed outside the optical fiber 19 so that the reflection layer 24 outside the optical fiber 19 so that the input light power (Pb) propagating in the clad is kept within the optical fiber 19 and that numerical aperture NA is extended.

The optical reflection layer 24 in FIG. 2(C) is formed by the process of depositing a mirror coating layer of dielectric material having high reflection coefficient onto the outside surface of the optical fiber. The optical reflection layer 24 can also be formed by a process of evaporating a metal film layer having a high reflection coefficient, i.e., a layer made of aluminum, copper, gold, or silver on the outside surface of the optical fiber. Thereafter, the enlarged input end-face can be formed by polishing the end-face of elliptically shaped enlarged portion 20.

After the total light reflection layer shown in FIG. 2(C) is formed, the optical fiber coupling interface with an enlarged input surface will be inserted into a ferrule 25 as shown in FIG. 1. When single-mode optical fiber 19 is inserted into the ferrule 25 and mounted therein, the enlarged elliptically shaped portion 20 is put into a beveled portion 27 at one end of a central hole 26 bored in the cylindrical ferrule 25. After the insertion process, ferrule 25 is polished at both ends 28, 29 thereof together with the end-faces of the optical fiber.

Thereafter, the optical axis of light source 30, i.e., an LD or an LED, is aligned with the axis to that of the optical fiber light coupling device having the enlarged input end-face, which is built in accordance with the present invention, and both the light source and light coupling device are disposed in a package to yeild an assembly of the light source and light coupling device.

As described heretofore, a mirror coating layer of dielectric material or metal film layer, having high reflection coefficient, is used in the light coupling portion of optical fiber interface 100 which is built in accordance with the present invention. The mirror coating layer of dielectric material has a reflection coefficient of 98% or more when the light beam is incident on this mirror coating layer at an incident angle of 45 degree or less. Such a metal film layer as a copper, gold, or silver film has a reflection coefficient of 98% or more when the light beam is incident on this metal film layer at a right angle. For further information, refer to "General Catalog" published by Newport Co., Ltd., page J-62 (1990), and to "Machine Design Handbook" published by Maruzen Co., Ltd., page 89 (1973).

Light power $I_0$ radiated from light source 30, i.e., an LD or an LED, is coupled to the end-face 28 at a high coupling efficiency as shown in FIG. 1.

The characteristics of the optical fiber light coupling interface with an enlarged input surface will be explained hereinafter.

Firstly, when the core radius a of the optical fiber which receives the light beam is enlarged to be twice as large as the normal core radius, light power Pa at the optical fiber core end-face is increased and light coupling efficiency η tends to increase and be free from offset d between the optical axes of the light source 30 and the optical fiber.

Secondly, when a pair of tapered portions are formed by fusing and drawing the optical fiber, mode radius ω is extended to the same size as clad radius b of the optical fiber. Since an apparent core area of the optical fiber is extended to the same size as clad radius b thereof, light power Pb which is input to the clad area of the optical fiber converges into the core thereof, wherein light power Pa is propagating along the core thereof, while light power Pb travels along a pair of tapered portions 22, 23.

Figure 4:
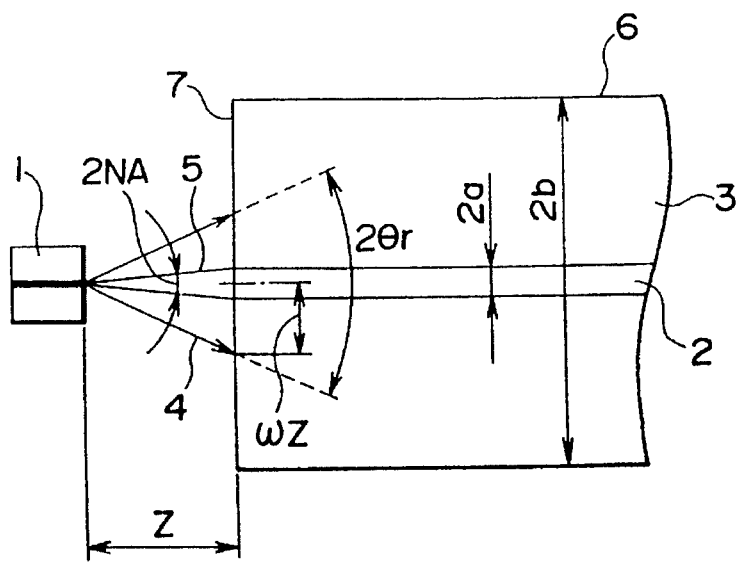
FIG. 4 shows the principle of operation of the light coupling in a light coupling device according to the prior art and wherein no lens system is used to couple a light source to an optical fiber end- face.
Figure 5:
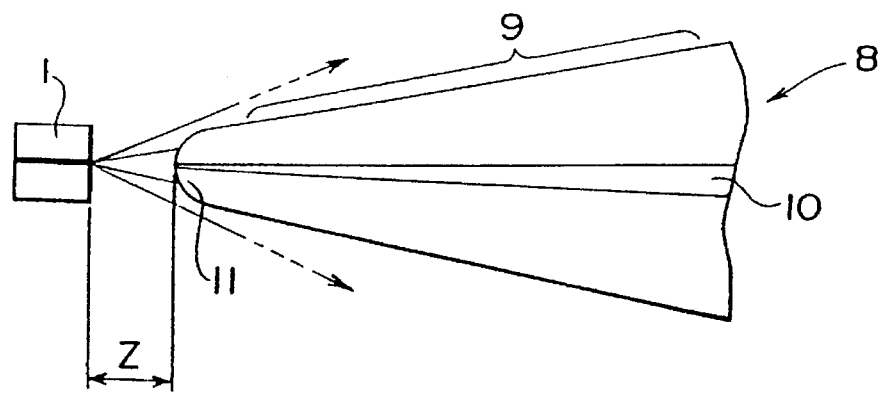
FIG. 5 shows a cross-sectional view of a conventional light coupling device built to improve the efficiency of light coupling when an alignment error has occurred among the optical axes of the optical components.
Figure 6:
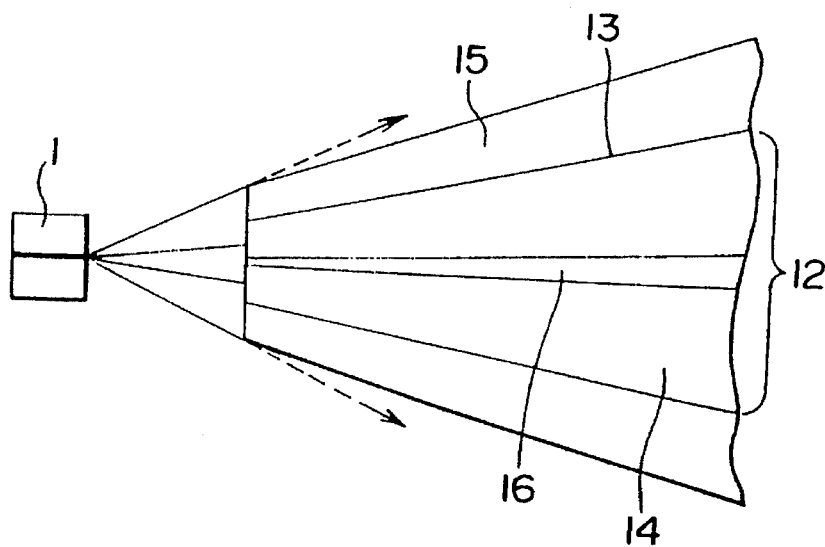
FIG. 6 shows a cross-sectional view of another example of a light coupling device according to the prior art and built to improve the efficiency of light coupling when an alignment error of the optical axis has occurred.

Thirdly, since in a conventional device such as shown in FIG. 4, light power Pb incident on the optical fiber clad end-face is normally lost because it is radiated outside the clad, no light power can propagate within the clad. In accordance to the present invention the optical reflection layer 24 is evaporated onto the outer surfaces of a pair of tapered portions 22, 23 so that the light power traveling the clad of the tapered portions can propagate through the clad while no radiation loss can occur in the clad portions.

If a light beam is incident on the optical fiber at an angle which is equal to or less than the numerical aperture (NA) of the single mode optical fiber (that is the angle of the radius is less or equal to approximately 5.3 degrees), light power Pa input to optical fiber core 17 can propagate along the core.

If light power Pa is input to optical fiber core 17 at the incident angle of numerical aperture NA or more, light power Pa generally goes out and enters into the clad. However, the optical fiber light coupling interface with an enlarged input surface according to the present invention is characterized in that the light power within the clad portions of the tapered portions converges into the core portions of the pair of tapered portions 22, 23. This implies that the numerical aperture (NA) can be disregarded. Light power Pb input to the clad end-face can propagate within the tapered portions 22, 23 without any restriction caused by incident angle since the clad portions of the pair of tapered portions 22, 23 are optically isolated from free space outside the clad portions by evaporated layer 24 having a high reflection coefficient. The light power which can be incident on the optical fiber end-face at an incident angle which is equivalent to or less than the Brewster's angle converges into the core of the optical fiber. The Brewster's angle $\theta_b$ is given by equation (3):

$$\theta_b = \tan^{-1} n_1 \quad (3)$$

where $n_1$ is the refractive index of the optical fiber.

If $n_1$ is 1.47, $\theta_b$ becomes 55.8 degrees. Since the angle of radiation for a laser diode is normally 25 to 30 degrees, the light power from the laser diode can easily be input to the optical fiber.

A change in mode radius ω due to the change of radius a in the optical fiber core has been cited in "Loss analysis of single-mode file splice", Bell System Technical Journal, Vol. 56, No. 5, pp. 703 by Marcuse D. (1977).

According to Marcuse, mode radius ω is given by equation (4) when radius a of the optical fiber core changes.

$$\omega = a(0.65 + 1.619/V^{1.5} + 2.879/V^6) \quad (4)$$

where V is the normalized frequency given by equation (5).

$$V = (2\pi a n_1/\lambda) \cdot \{2(n_1 - n_2)/n_1\}^{1/2} \quad (5)$$

where λ(μm) is the wavelength of the light emitted from the light source, a(μm) is the radius of the optical fiber core, $n_1$ is the refractive index of the optical fiber core, and $n_2$ is the refractive index of the optical fiber clad.

Figure 3:
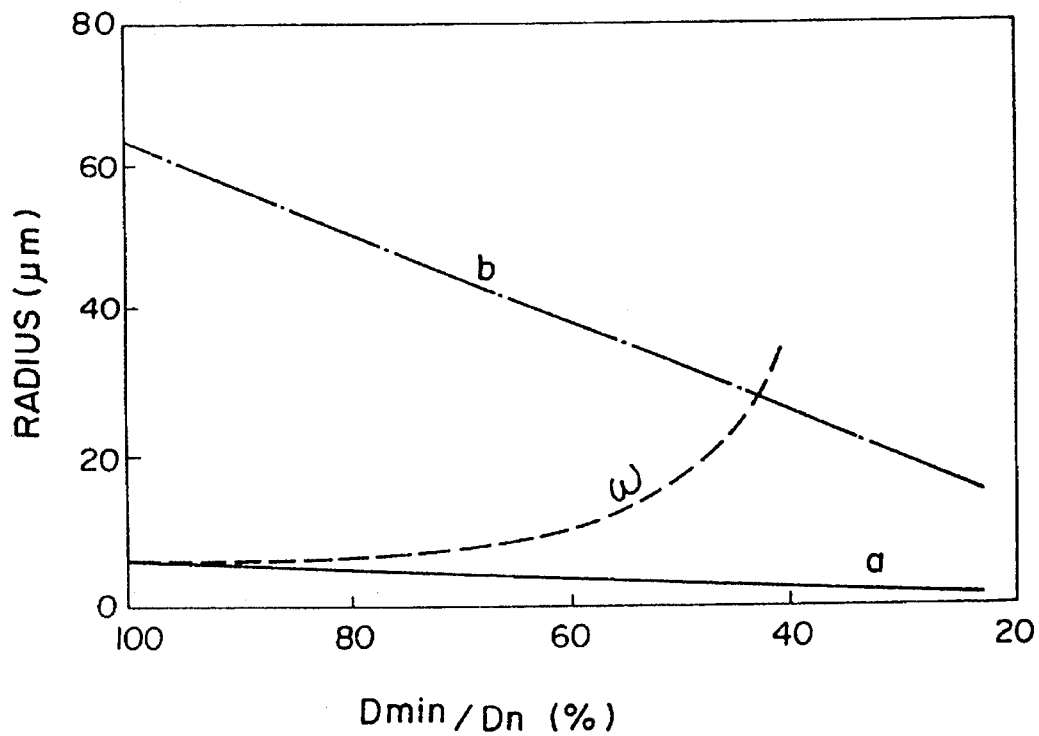
FIG. 3 shows relationships of the mode radius ($\omega$), radius (a) of an optical fiber core, and radius (b) of the optical fiber clad as functions of the ratio of the minimum radius of the core and clad radius of the tapered portion to that of the normal optical fiber.

FIG. 3 shows the relationships of the mode radius(ω), radius(a) of the optical fiber core, and radius(b) of the optical fiber clad as functions of the ratio ($D_{min}/D_n$) of the minimum radius of the core and clad of the tapered portions to thate of the normal optical fiber. In FIG. 3, λ=1.31 μm, a=5 μm, $n_1$=1.47, $n_2$=1.46, and b=62.5 μm are assumed.

The optical fiber light coupling interface with an enlarged input surface according to the present invention, is as described heretofore, characterized in that a pair of tapered portions are formed by fusing and drawing a standard single-mode optical fiber near the incident end-face. During the above process, the radius a of optical fiber core 17 is reduced along the tapered portions, and light power Pb propagating in the clad portions of the tapered portions converges into optical fiber core 17 through which light power Pa is propagating. As radius a of optical fiber core 17 becomes small, mode radius ω of optical fiber core 17 is extended as shown in FIG. 3.

The area where mode radius ω is extended is optically regarded as the optical fiber core area. The optical fiber light coupling interface with an enlarged input surface according to the present invention is operated based on this mode of optical properties.

Light power Pa propagating within optical fiber core 17, which is input from the light source to optical fiber core 17, is partly going out to the mode radius area in the pair of tapered portions due to an evanescent effect, and is combined with light power Pb propagating within the optical fiber clad. This mode of propagation results in combined light power (Pa+Pb) propagating within the optical fiber clad. As mode radius ω becomes small and the light beam propogates within second tapered portion 23 whose radius becomes large as the distance from the incident end-face increases beyond the midpoint of the tapered portions, the propagating light power (Pa+Pb) is concentrated into the area within radius a of the optical fiber core. The combined light power P=Pa+Pb finally converges into optical fiber core 17 so that light power P can propagate within optical fiber core 17.

When the ratio of the radius of the tapered portion at its minimum to that of the normal optical fiber is approximately 40% in FIG. 3, radius b of the optical fiber clad and mode radius ω are respectively 27 to 28 μm, which are the same. When this ratio is 40%, the object of the present invention can be fulfilled.

The value of angle θ which defines the radius change with distance for the tapered portions of a single mode optical fiber surface according to the present invention, needs not be strictly determined, but is preferred to be set at a number which is equal to or less than threshold angle θc of the optical fiber used to fabricate the light coupling device of optical fiber type. Threshold angle θc of the single mode optical fiber shown in FIG. 3 is approximately 3.6 degrees.

As described heretofore, the optical fiber light coupling interface with an enlarged input surface according to the present invention feeds the light power from the light source to the optical fiber. The optical fiber light coupling device is constructed using an optical reflection layer and a light coupling portion. The light coupling portion consists of the enlarged optical fiber input end-face, including the enlarged core and the enlarged clad, and a pair of tapered portions. These enlarged core and clad are fabricated by a process where a stress of compression is applied to a part of the optical fiber along the optical axis of the optical fiber so that the radius of the part of the optical fiber increases while the part of the optical fiber is fused by heating. The optical fiber is thereafter cut along the plane perpendicular to the optical axis of the optical fiber at the point where the radius of the optical fiber is extended, and the cut plane is then polished. The pair of tapered portions are such in that the radii of the core and clad of the normal optical fiber portion near the enlarged optical fiber input end-face portion are gradually decreased as the distance from the enlarged optical fiber input end-face portion increases, and then increased again until they reach the normal optical fiber radius after passing through the minimum radius. The optical reflection layer is formed outside the coupling means.

All the light power emitted from the light source and received by the enlarged optical fiber end-face containing both the core and clad becomes the effective light power which propagates along the core.

An allowance of the offset of the optical axes between the light source and single mode optical fiber can be increased as compared with that in the prior art. Assume that radiation angle θr of the light beam emitting from the light source is 25 degrees, and that distance z between the light source and the incident end-face of the optical fiber is 100 μm. At that time, radius ωz of the light beam becomes approximately 47 μm. If allowance d of the offset of the optical axes between the light source and the optical fiber is for practical purposes at ±5 μm, the light coupling device of the present invention can be assembled without any light axis adjustment. If allowance d is 5 μm, the light coupling loss in the light coupling device of the present invention is 2.2%. Even if the light coupling device is built without any light axis adjustment, high coupling efficiency can easily be obtained.

What are claimed are:

1. An optical fiber light coupling interface effective for feeding and propagating light power dispersed from a light source, the interface including an optical fiber having an optical axis, a core, and a clad surrounding the core, the core and the clad having respective radii, wherein the optical fiber further includes:

an enlarged input end face where the respective radii of the core and the clad assume respective first values, the respective radii of the core and the clad thereafter decreasing in a direction away from the input end face along the optical fiber to respective second values, the respective second values being less than the respective first values;

a first transitional region disposed adjacent the input end face where the respective radii of the core and the clad are at their respective second values;

a first tapered portion where the respective radii of the core and the clad decrease, in a direction away from the input end face along the optical fiber, from their respective second values at the first transitional region to respective minimum values;

a second transitional region disposed adjacent the first tapered portion where the respective radii of the core and the clad are at their respective minimum values;

a second tapered portion where the respective radii of the core and the clad increase, in a direction away from the input end face along the optical fiber, from their respective minimum values at the second transitional region to their respective second values; and an optical reflection layer formed radially outwardly from the core and the clad.

2. The interface according to claim 1, wherein the optical reflection layer comprises one of a mirror coating layer of dielectric material and a metal film layer having a high coefficient of reflection for reflecting all of the light incident thereon.

3. The interface according to claim 1, further including a ferrule defining a bore at a central region thereof for receiving the optical fiber, the optical fiber thereby being mounted within the bore of the ferrule.

4. The interface according to claim 1, wherein the input end face of the optical fiber is disposed at an end region of the bore of the ferrule.

5. A method of forming the interface according to claim 1, comprising the steps of:

applying a compressive stress to the optical fiber along the optical axis thereof so that the respective radii of the core and the clad are enlarged at a first part of the optical fiber;

fusing the first part of the optical fiber by heating while applying the compressive stress thereby forming an enlarged part of the optical fiber;

cutting the optical fiber in a direction perpendicular to its optical axis at the enlarged part thereof thus forming a cut plane;

polishing the cut plane to form the input end face; and forming an optical reflection layer radially outwardly from the core and the clad.

6. The method according to claim 5, further including the steps of:

drawing the optical fiber along the optical axis thereof so that the respective radii of the core and the clad are reduced at a second part of the optical fiber; and fusing the second part of the optical fiber by heating while drawing the optical fiber thereby forming the second transitional region of the optical fiber.

7. An optical fiber light coupling interface effective for feeding and propagating light power dispersed from a light source, the interface including an optical fiber having an optical axis, a core member extending along the optical axis, and a clad member surrounding the core member, the core and clad members each having respective radii, the optical fiber further comprising:

an input end-face portion, the radii of said core and clad members having respective first values at said input end-face portion of said optical fiber;

a midpoint portion, the radii of said core and clad members having respective second values at said midpoint portion of said optical fiber, said second values being less than said first values;

a first transitional region interposed between the input end-face portion and the midpoint portion of said optical fiber, the respective radii of the core and clad members decreasing from said input end-face portion to said midpoint portion;

an output end-face portion, the radii of said core and clad members having respective third values at said output end-face of said optical fiber, said third values being intermediate said first and second values;

a second transitional region interposed between said midpoint portion and said output end-face portion of said optical fiber, the respective radii of the core and clad increasing from said midpoint portion to said output end-face portion; and an optical reflection layer surrounding the clad of said optical fiber.

* * * * *

UNITED STATES PATENT AND TRADEMARK OFFICE
CERTIFICATE OF CORRECTION

PATENT NO. : 5,530 781
DATED : June 25, 1996
INVENTOR(S) : Mitsuo Takahashi

It is certified that error appears in the above-indentified patent and that said Letters Patent is hereby corrected as shown below:

On the title page, item [73], the assignee's name should read --Seikoh Giken Co., Ltd.--.

Signed and Sealed this

Eighth Day of October, 1996

Attest:

BRUCE LEHMAN

Attesting Officer

Commissioner of Patents and Trademarks